United States Patent
Chevallier-Mames et al.

(10) Patent No.: US 8,374,341 B2
(45) Date of Patent: Feb. 12, 2013

(54) HASH FUNCTION USING A CUE SPORTS GAME PROCESS

(75) Inventors: Benoit Chevallier-Mames, Paris (FR); Mathieu Ciet, Paris (FR); Augustin J. Farrugia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 471 days.

(21) Appl. No.: 12/541,850

(22) Filed: Aug. 14, 2009

(65) Prior Publication Data

US 2010/0304807 A1 Dec. 2, 2010

Related U.S. Application Data

(63) Continuation-in-part of application No. 12/475,337, filed on May 29, 2009, now abandoned.

(51) Int. Cl.
 *H04K 1/00* (2006.01)
(52) U.S. Cl. .................. 380/28; 463/2; 463/43; 713/170
(58) Field of Classification Search ............... 463/2, 17, 463/43; 380/28; 713/170
 See application file for complete search history.

(56) References Cited

U.S. PATENT DOCUMENTS

| | | | |
|---|---|---|---|
| 2005/0215323 A1* | 9/2005 | Miyamoto et al. | 463/43 |
| 2006/0100016 A1* | 5/2006 | Hamano et al. | 463/36 |
| 2009/0082099 A1* | 3/2009 | Luciano et al. | 463/26 |
| 2010/0203960 A1* | 8/2010 | Wilson et al. | 463/29 |
| 2010/0304826 A1* | 12/2010 | Chevallier-Mames et al. | 463/17 |
| 2010/0306541 A1* | 12/2010 | Chevallier-Mames et al. | 713/170 |

* cited by examiner

*Primary Examiner* — Edward Zee
*Assistant Examiner* — Suman Debnath
(74) *Attorney, Agent, or Firm* — Adeli & Tollen LLP

(57) ABSTRACT

In the computer data security field, cryptographic hash function processes embodied in a computer system and which are typically keyless, but are highly secure. The processes are based on the type of randomness exhibited by well known table "cue sports" games such as billiards, snooker, and pool played on a billiards table involving the players striking one of a plurality of balls with a cue, the struck ball then hitting other balls, the raised sides of the table, and in some cases one or more balls going into pockets in the corners and/or sides of the table. Computation of the hash value (digest) is the result of providing a model (such as expressed in computer code) of such a game algorithm and using the message as an input to the game algorithm, then executing the game algorithm. A state of the game after one or several "shots" gives the hash digest value of the message.

25 Claims, 3 Drawing Sheets

| TABLE_SIZE | integer | word size of Table |
| TABLE | word array | an array, symbolizing a billiard table containing balls |
| CurrentPosition | integer | a position where the player would shoot |
| CurrentBall | word | the value at CurrentPostion in Table |
| CurrentTarget | integer | the distance of the player's shot |
| AccumulatedEnergy | word | the energy of the player's shot |
| kSEC_PARAMETER | integer | how many balls were shot during the game |

Fig. 1

HASH FUNCTION USING A CUE SPORTS GAME PROCESS

CROSS REFERENCE TO RELATED APPLICATION

This application is a continuation-in-part application of U.S. application Ser. No. 12/475,337 filed May 29, 2009, titled "HASH FUNCTION USING A CUE SPORTS GAME PROCESS".

FIELD OF THE INVENTION

This invention relates to computers, computer data security, and hash functions (hashing).

BACKGROUND

Hash functions are well known in the field of data security. The principal is to take data (a digital message, digital signature, etc.) and use it as an entry to a hash function resulting in an output called a "digest" of predetermined length which is intended to uniquely identify ("fingerprint") the message. A secure (cryptographic) hash is such that any alteration in the message results in a different digest, even though the digest is much shorter than the message. Such hash functions are "collision-resistant" and "one-way."

Cryptography and data security deal with digital signatures, encryption, document authentication, and hashing. In all of these fields, there is a set of basic tools/functions which are widely used, for instance hash functions. Several properties are required for the use of hash functions in cryptographic applications: preimage resistance, second preimage resistance and collision resistance.

In the recent years, much energy has been expended finding new hash functions, since collisions (weaknesses or successful attacks) have been found in the widely used SHA-1 standard hash.

SUMMARY

Disclosed here is a new type of cryptographic (secure) hash function or process. The goal is a highly modular hash function that is also computationally efficient (fast). The present hash function can conventionally be used for document integrity for exchanges and signatures. It can be also used as a derivation function or as a HMAC (hash message access code) by adding a key conventionally (as in for instance the well known HMAC-SHA1) and the term "hash" as used herein is intended to encompass all these uses, both keyed and non-keyed.

A hash function is a deterministic procedure that accepts an arbitrary input value, and returns a hash value. The input value is called the message, and the resulting output hash value is called the digest. The message is authenticated by comparing the computed digest to an expected digest associated with the message.

The present hash process is based on the concept and rules and physics of physical cue sports games. Cue sports are a set of games of skill generally played with a cue stick which is used by the player to strike billiard balls, moving them around a cloth-covered billiards table bounded by cushions. Historically, the term is billiards. While that name is still employed by some for all such games, the word's usage has splintered into more exclusive competing meanings among certain groups and geographic regions. In the United Kingdom, "billiards" refers exclusively to English billiards, while in the United States it is sometimes used to refer to a particular game or class of games, or to all cue games in general, depending upon dialect and context.

There are three major subdivisions of games within cue sports: Carom billiards, referring to games played on tables without pockets, including among others balkline and straight rail, cushion caroms, three-cushion billiards and artistic billiards. Pocket billiards (or "pool") is generally played on a table with six pockets, including among others eight-ball (the world's most widely played cue sport), nine-ball, straight pool, one-pocket and bank pool. Snooker, while technically a pocket billiards game, is generally classified separately based on its historic divergence from other games, as well as a separate culture and terminology that characterize its play.

No actual (physical) game is played or even displayed in accordance with the invention. Instead a "notional" cue sports game (in terms of movement of the billiard balls) is modeled mathematically, without players. In the present hash function, there is no introduction of randomness from the user since the way the billiard balls (which are notional) move is uniquely determined by the input in one embodiment. This means the hash function disclosed here is completely deterministic. The notional cue sports game is any one of the above described games or variants thereof (whether known or with modifications unique to the present system), and need not conform to any such actual game in terms of rules or the physics of the ball movements.

The present approach is based on the observation that actual cue sports games exhibit a high degree of randomness in the way the balls move on the billiards table. The present goal is to use the principle of such games to compute a hash function since such a chaotic (randomness) characteristic provides a secure hash function. In this sense secure means strongly one way, meaning that given a message it is easy to compute the digest, but it is very difficult to find a message that returns a given digest.

Since such games are well known and exist in many variants, programming details of the ball movement and interaction modeling algorithm (which models such games as a process) are not given here as being well known. There is a substantial literature on the physics of cue sports, complete with mathematical models of the relevant physics. See an early example "Théorie mathématique des effects du jeu de billiard", Journal de l'Ecole Polytechnique, by G. Coriolis, 1835. This literature provides the mathematical models used in accordance with the invention to model ball movement and interaction. Writing the portions of the code that embody the physics of the ball movement is relatively simple given these models. Many variations of such games are known and their principles may be used in accordance with the invention, given however that here no person is playing a physical game but there is execution of the core algorithm (physics and rules) of such a game to generate the hash digest. Moreover the present hash function is computed very rapidly in computer software (or hardware—dedicated circuitry). For instance, a "checksum" is used when transferring data requires fast determination of the digest. This hash function is especially useful when transferring large amounts of data.

Note that terms such as "ball," "strike," "billiard table," "energy," "target," "position," and "game" used here in connection with the present invention do not refer to any physical object or game or any actual depiction of same even on a computer or game display, but instead to values, identifiers, or variables used in computer code or logic to compute a hash function or equivalent, and are used only for convenience of understanding herein as referring conceptually to analogous aspects of the above described cue sports games.

BRIEF DESCRIPTION OF THE FIGURES

FIG. 1 shows a set of variables and parameters.

DETAILED DESCRIPTION

Figure 2:
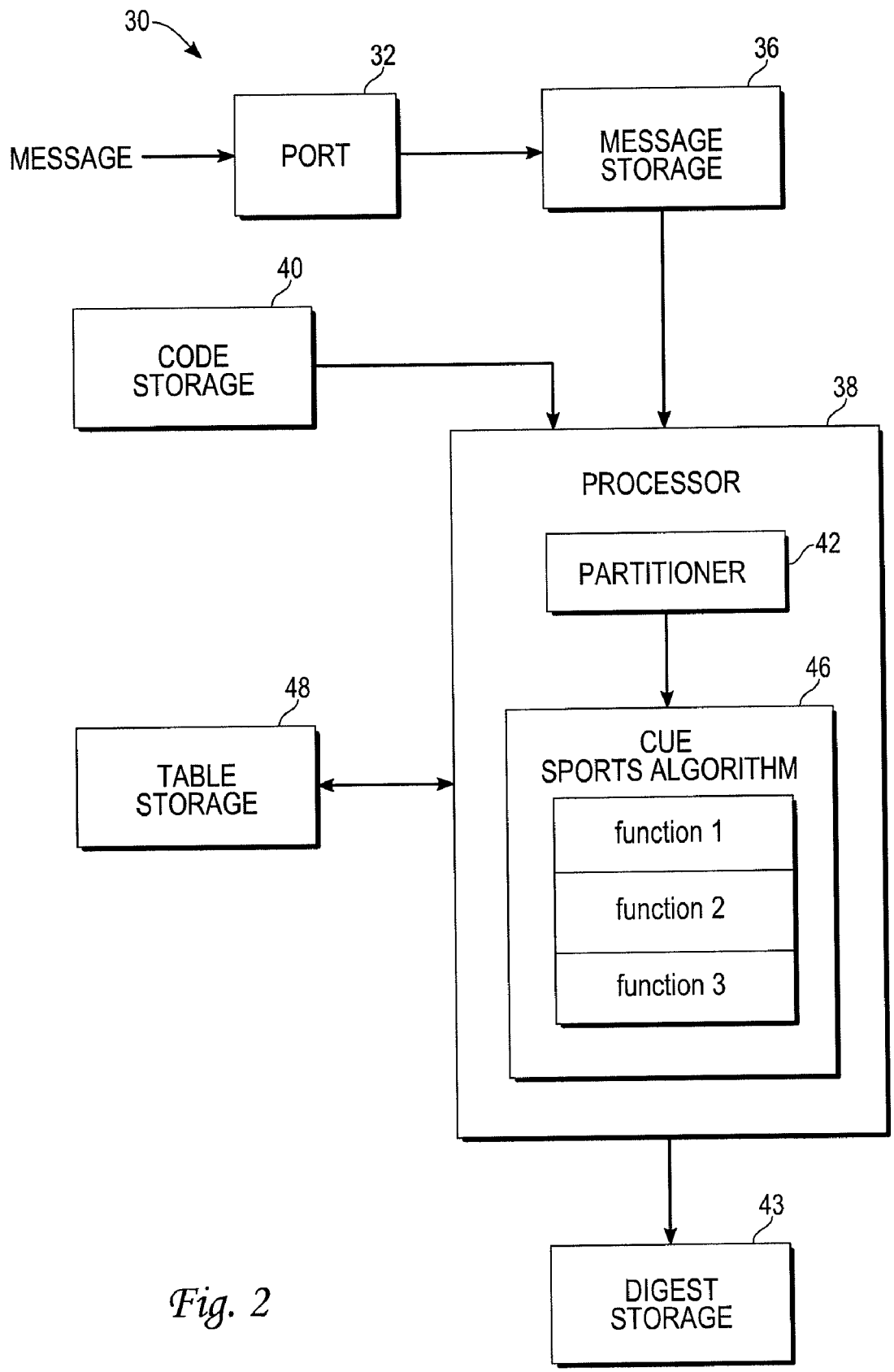
FIG. 2 shows relevant portions of a computing device for carrying out the present method.

The present method and apparatus use certain principles of cue sports games as referred to above. In one embodiment, data expressing aspects of such a game are stored in a large buffer (a data structure stored in a conventional computer readable memory) denoted TABLE (a word array) containing a constant denoted TABLE_SIZE indicating the number of words in TABLE. TABLE_SIZE is a predetermined integer value. This array TABLE can be viewed as expressing the state of a notional cue sports game (e.g. billiards) table in terms of the ball movements and locations. Each entry of this array is equivalent to a notional game ball and is e.g. one data word in length or any other suitable length and of course expressed in binary form. The initial values of the entries of TABLE are the input message to be hashed which is conventionally first partitioned into blocks of some predetermined length, each block filling TABLE. If needed the message is conventionally padded to fill TABLE. The game algorithm starts by choosing a fixed position (entry) in the array (buffer) denoted CurrentPosition. In this position, there is a certain data word corresponding (equivalent) to a notional ball denoted CurrentBall. The notional player notionally shoots this CurrentBall. A given ball target denoted CurrentTarget is also selected. In the notional game, this is where the notional player wants to shoot the notional ball CurrentBall. Finally, to fully determine the system, the energy of the shot is selected, denoted AccumulatedEnergy. This shot energy is also a function of the TABLE entries using a derivation function of any type.

TABLE is expressed as (CurrentPosition+CurrentTarget) % TABLE_SIZE, where "%" as usual denotes the modulus mathematical operator.

When a notional ball is moving, it strikes other notional balls on the notional billiards table. Thus, the energy of the notional shot (AccumulatedEnergy) is reduced by these impacts. The struck notional balls are modified (moved) by this impact energy. At the end of the notional shot, the remaining AccumulatedEnergy is assigned to the final location; the notional ball at the final destination is moved in TABLE by 1 step (entry) or more, and is replaced by the ball (CurrentBall) the notional player has shot.

New values for CurrentPosition and consequently CurrentBall, CurrentTarget and AccumulatedEnergy are defined, based on the TABLE and on the message (the initial values in TABLE) using as explained above a derivation function of any type.

The process is applied a predetermined integer number of times denoted kSEC_PARAMETER defining the level of security of the process. Considering the notional billiards table, this is exactly as if the notional player was shooting several times determined by the value of kSEC_PARAMETER using balls on the billiard table.

The following is a pseudo-code representation of computation of the present hash function using this approach. It does not include the way the input message is initially stored in TABLE, preliminarily to execution of the game algorithm, since this can be done in several different but equally secure ways and the game algorithm is independent of that. The resulting hash digest is conventionally extracted from the word array TABLE for instance by choosing certain entries to be the hash digest. The pseudo-code is conventionally structurally similar to actual code but somewhat less detailed and is not executable and is as follows:

```
for (j = 0; j < kSEC_PARAMETER; j++)
{
    /* CurrentBall moves to CurrentTarget, and modifies struck balls */
    for (k = 0; k < CurrentTarget; k++)
    {
        // Energy is decreased when striking balls
        AccumulatedEnergy = (AccumulatedEnergy − function1(Table[(CurrentPosition
            + k) % TABLE_SIZE])) % MAX_ENERGY;
        // Struck balls are modified
        Table[(CurrentPosition + k) % TABLE_SIZE] ^= function2(AccumulatedEnergy);
    }
    /* CurrentBall impacts on the final ball at the end */
    CurrentPosition = (CurrentPosition + CurrentTarget) % TABLE_SIZE;
    // Use accumulated energy to modify the target balls
    Table[CurrentPosition] ^= AccumulatedEnergy;
    // Moves the target ball from one place
    Table[(CurrentPosition+1) % TABLE_SIZE] += Table[CurrentPosition];
    // Moved ball takes the place of the target ball
    Table[CurrentPosition] = CurrentBall;
    // New values for next shot
    CurrentBall = Table[CurrentPosition];
    (CurrentTarget, AccumulatedEnergy) = function3(Table, inputs)
}
```

At this step, the initial conditions of the system are fully determined. Now consider the update part of the system, equivalent to execution of the notional game shot or shots, expressed logically as follows:

To move the ball (CurrentBall) from its current position in TABLE which is CurrentPosition to the new position in Operators used in this pseudo code are conventional for the C computer language. "++" denotes increment by one. All text delimited between "/*" and "*/" are comments and part of the program itself and so not compiled. The operator "^" as usual denotes the Boolean exclusive OR operation and "^=" the exclusive OR operation plus an assignment.

Function function1, function2, function3 are functions that each may have various implementations. These functions depend on the system (type and detail of the notional cue sports game) being modeled. Function1 defines how much the energy AccumulatedEnergy is decreasing. Function2 defines the impact of the shot ball on the system. Finally, function3 defines the next operation (ball impact) that occurs. In other words these functions model physically (using well known physics equations easily expressed in computer code or equivalent as described above) the interactions of the notional balls and billiard table. The degree of modeling (based on the physics of the notional game) varies in different embodiments depending on the level of complexity desired as explained above.

An example of function1 is based on conventional Newtonian mechanics. Given that the frictional force of a billiards table surface on a moving billiard ball is inversely proportional to the speed (velocity) of the ball, then $$\text{frictional force} = k/\text{velocity}$$

where k is a constant.

Then since the ball's kinetic energy is $\frac{1}{2} \ast \text{mass} \ast \text{velocity}^2$, where the mass is that of the ball, the kinetic energy dissipated by the shot ball rolling on the table is equal to:

$$1/2 \ast mass \ast \left(\frac{k}{\text{frictional force}}\right)^2$$

which expresses in one embodiment function1.

Function2 expresses the result of one notional ball striking another in terms of lost energy (and change in velocity). This function depends on the notional elasticity of the balls as well as the angle (vector) at which one ball strikes another, and is based on conventional Newtonian conservation of momentum equations involving ball mass and velocity.

Function3 determines, after one notional ball strikes another, what event (ball collision) occurs next. Typically this is somewhat simpler than a full blown Newtonian physics based analysis to make it easier to model, or may be more complex.

Also function1, function2 and function3 may assume that the notional balls (as represented by the TABLE entries) are not perfectly spherical for further complexity. Further the qualities of each notional ball (the TABLE entries) may differ in terms of departure from sphericity, elasticity, and other (notional) physical factors. (All of these factors have well understood effects on the notional ball movements and are readily modeled by embodiments of the functions.)

FIG. 1 shows variables and parameters for the above pseudo code (first column) with their type (second column) and explanatory comments (third column).

FIG. 2 shows in a block diagram relevant portions of a computing device (system) 30 in accordance with the invention. This is, e.g., a server platform, computer, mobile telephone, Smart Phone, personal digital assistant or similar device, or part of such a device and includes conventional hardware components executing in one embodiment software (computer code) as represented by the above pseudo-code example. This code may be, e.g., in the C or C++ computer language or its functionality may be expressed in the form of firmware or hardware logic; writing such code or designing such logic would be routine in light of the above pseudo code. Of course, the above pseudo code example is not limiting.

The computer code is conventionally stored in code memory (computer readable storage medium) 40 (as object code or source code) associated with conventional processor 38 for execution by processor 38. The incoming message (in digital form) is received at port 32 and stored in computer readable storage medium (memory) 36 where it is coupled to processor 38. Processor 38 conventionally partitions the message into suitable sized blocks at partitioning module 42. Other software (code) modules in processor 38 are the cue sports algorithm module 46 which carries out the pseudo code functionality set forth above including function1, function2, and function3.

Also coupled to processor 38 are the TABLE computer readable storage medium (memory) 48 (which also stores the energy values), as well as a third storage 43 for the resulting extracted hash digest. The hash digest is conventionally extracted from TABLE, for instance as n consecutive TABLE entries. Storage locations 36, 43, 48 may be in one or several conventional physical memory devices (such as semiconductor RAM or its variants or a hard disk drive).

Electric signals conventionally are carried between the various elements of FIG. 2. Not shown in FIG. 2 is the subsequent conventional use of the resulting hash digest stored in storage 43, which is compared by processor 38 to a second expected hash digest value associated with the incoming message and stored in memory 36. Only if the two hash digest values match is the message (a digital document, digital signature or similar information) authenticated.

Figure 3:
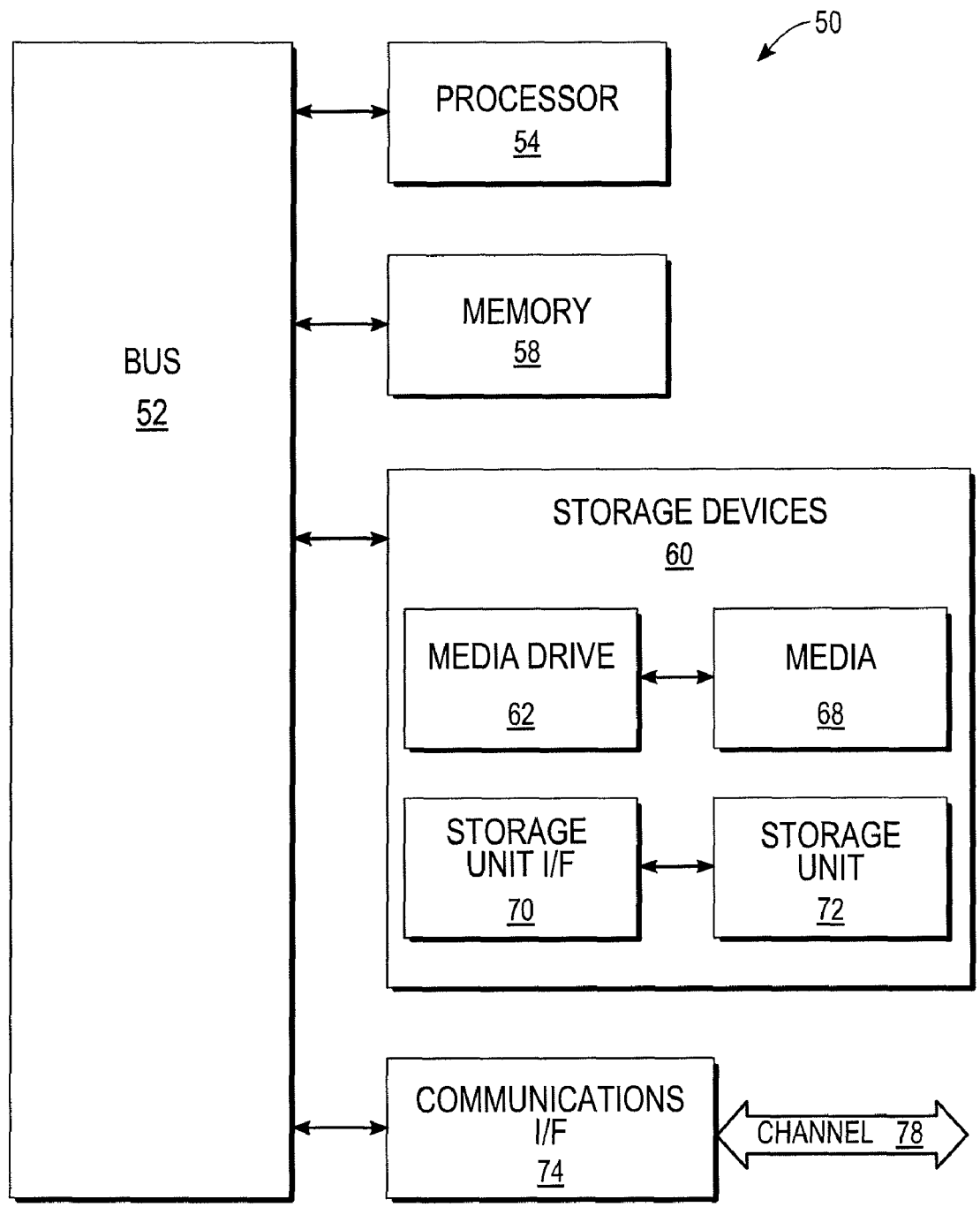
FIG. 3 shows additional detail of the FIG. 2 computing device.

FIG. 3 shows further detail of the FIG. 2 computing device in one embodiment. FIG. 3 illustrates a typical and conventional computing system 50 that may be employed to implement processing functionality in embodiments of the invention and shows additional detail of the FIG. 2 system. Computing systems of this type may be used in a computer server or user (client) computer or other computing device, for example. Those skilled in the relevant art will also recognize how to implement embodiments of the invention using other computer systems or architectures. Computing system 50 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 50 can include one or more processors, such as a processor 54 (equivalent to processor 38 in FIG. 2). Processor 54 can be implemented using a general or special purpose processing engine such as, for example, a microprocessor, microcontroller or other control logic. In this example, processor 54 is connected to a bus 52 or other communications medium. Note that in some embodiments the present process is carried out in whole or in part by "hardware" (dedicated circuitry) which is equivalent to the above described software embodiments.

Computing system 50 can also include a main memory 58 (equivalent to memories 36, 43, 48), such as random access memory (RAM) or other dynamic memory, for storing information and instructions to be executed by processor 54. Main memory 58 also may be used for storing temporary variables or other intermediate information during execution of instructions to be executed by processor 54. Computing system 50 may likewise include a read only memory (ROM) or other static storage device coupled to bus 52 for storing static information and instructions for processor 54.

Computing system 50 may also include information storage system 60, which may include, for example, a media drive 72 and a removable storage interface 70. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 68 may include, for example, a hard disk, floppy disk, magnetic tape, optical disk, CD or DVD, or other fixed or removable medium that is read by and written to by media drive 72. As these examples illustrate, the storage media 68 may include a computer-readable storage medium having stored therein particular computer software or data.

In alternative embodiments, information storage system 60 may include other similar components for allowing computer programs or other instructions or data to be loaded into computing system 50. Such components may include, for example, a removable storage unit 72 and an interface 70, such as a program cartridge and cartridge interface, a removable memory (for example, a flash memory or other removable memory module) and memory slot, and other removable storage units 72 and interfaces 70 that allow software and data to be transferred from the removable storage unit 68 to computing system 50.

Computing system 50 can also include a communications interface 74 (equivalent to port 32 in FIG. 2). Communications interface 74 can be used to allow software and data to be transferred between computing system 50 and external devices. Examples of communications interface 74 can include a modem, a network interface (such as an Ethernet or other network interface card (NIC)), a communications port (such as for example, a USB port), a PCMCIA slot and card, etc. Software and data transferred via communications interface 74 are in the form of signals which can be electronic, electromagnetic, optical or other signals capable of being received by communications interface 74. These signals are provided to communications interface 74 via a channel 78. This channel 78 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 58, storage device 68, or storage unit 72. These and other forms of computer-readable media may store one or more instructions for use by processor 54, to cause the processor to perform specified operations. Such instructions, generally referred to as "computer program code" (which may be grouped in the form of computer programs or other groupings), when executed, enable the computing system 50 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 50 using, for example, removable storage drive 68, drive 72 or communications interface 74. The control logic (in this example, software instructions or computer program code), when executed by the processor 54, causes the processor 54 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A hashing method performed by a computing apparatus and comprising the acts of:
    (a) receiving a message to be subject to the hashing method at an input port;
    (b) storing the received message as a table having a plurality of entries in a first computer readable storage coupled to the input port;
    (c) selecting, by a processor coupled to the first storage, a first of the entries of the stored message as a current position in a cue sports algorithm;
    (d) selecting, by the processor, a second of the entries as a target in the cue sports algorithm;
    (e) determining and storing, by the processor, an energy value of the cue sports algorithm in a second computer readable storage coupled to the processor;
    (f) computing, by the processor, entries for the table as a function of the first and second entries and the energy value, according to the cue sports algorithm;
    (g) updating the table according to at least one computed entry;
    (h) extracting entries from the updated table resulting from act (g) to provide a hash value of the message; and
    (i) storing, by the processor, the hash value in a third computer readable storage;
    wherein no game is displayed and there is no user input to the cue sports algorithm.

2. The method of claim 1, wherein the determining includes determining the energy value as a function of the table.

3. The method of claim 1, wherein the energy value is decreased as a function of the first entry.

4. The method of claim 1, wherein storing the received message further includes partitioning the message into blocks of predetermined length to define the entries.

5. The method of claim 1, wherein the cue sports algorithm includes a model of interaction of a set of balls on a surface.

6. The method of claim 5, wherein the first entry represents a first ball of the set being shot and the second entry represents a second ball of the set being struck by the first ball.

7. The method of claim 1 further comprising the acts of:
    receiving a hash value associated with the message at the processor;
    comparing the received hash value to the stored hash value; and
    authenticating the message if the comparison indicates a match.

8. The method of claim 1, wherein the message is one of a digital signature or document, a digital message, a secret key or an identifier.

9. The method of claim 1 further comprising the acts of:
    providing a security parameter; and
    repeating the acts (c)-(i) a number of times equal to the security parameter.

10. The method of claim 1, wherein each entry in the table is one bit of data, one byte of data, one 16-bit word, one 32-bit word, one 64-bit word, or one 128-bit word.

11. The method of claim 1, wherein the cue sports algorithm includes a first function determining the energy value, a second function determining interactions between the entries, and a third function determining an order of the interactions.

12. The method of claim 11, wherein the interactions represent collisions between balls in the cue sports algorithm.

13. A non-transitory computer readable medium storing computer code instructions for executing the method of claim 1 on the computing apparatus.

14. An apparatus for computing a hash, comprising:
(a) an input port for receiving a message whose hash is to be computed;
(b) a first computer readable storage coupled to the input port for storing the received message as a table having a plurality of entries; and
(c) a processor, coupled to the first storage, for selecting a first of the entries as a current position in a cue sports algorithm;
(d) wherein the processor selects a second of the entries as a target of the cue sports algorithm;
(e) wherein the processor determines and stores an energy value of the cue sports algorithm in a second computer readable storage coupled to the processor;
(f) wherein the processor, according to the cue sports algorithm, computes entries for the table as a function of the first and second entries and the energy value;
(g) wherein the processor updates the table according to at least one computed entry;
(h) wherein the processor extracts entries from the updated table to provide a hash value of the message; and
(i) wherein the processor stores the hash value in a third computer readable storage coupled to the processor;
wherein no game is displayed and there is no user input to the cue sports algorithm.

15. The apparatus of claim 14, wherein the processor determines the energy value as a function of the table.

16. The apparatus of claim 14, wherein the energy value is decreased as a function of the first entry.

17. The apparatus of claim 14, wherein the processor further partitions the message into blocks of predetermined length to define the entries.

18. The apparatus of claim 14, wherein the cue sports algorithm includes a model of interaction of a set of balls on a surface.

19. The apparatus of claim 18, wherein the first entry represents a first ball of the set being shot and the second entry represents a second ball of the set being struck by the first ball.

20. The apparatus of claim 14, wherein the processor further:
receives from the port a hash value associated with the message;
compares the received hash value to the stored hash value; and
authenticates the message if the comparison indicates a match.

21. The apparatus of claim 14, wherein the message is one of a digital signature or document, a digital message, a secret key or an identifier.

22. The apparatus of claim 14,
wherein the processor iterates (i) selecting of the first and second entries, (ii) determining and storing the energy value, (iii) computing the entries for the table, (iv) updating the table, and (v) providing and storing the hash value a number of times equal to a value derived from a provided security parameter.

23. The apparatus of claim 14, wherein each value in the table is one bit of data, one byte of data, one 16-bit word, one 32-bit word, one 64-bit word, or one 128-bit word.

24. The apparatus of claim 14, wherein the cue sports algorithm includes a first function determining the energy value, a second function determining interactions between the entries, and a third function determining an order of the interactions.

25. The apparatus of claim 24, wherein the interactions represent collisions between balls in the cue sports algorithm.

* * * * *